United States Patent [19] [11] 4,027,555

Rauchle et al. [45] June 7, 1977

[54] ENGINE TRANSMISSION AND SPEED CONTROL WITH WARM-UP INTERLOCK APPARATUS

[75] Inventors: Roy J. Rauchle; John L. Vandenberg, both of Oshkosh, Wis.

[73] Assignee: Brunswick Corporation, Skokie, Ill.

[22] Filed: July 12, 1974

[21] Appl. No.: 488,028

[52] U.S. Cl. .................................... 74/878; 74/876

[51] Int. Cl.² .......................................... B60K 41/04

[58] Field of Search ............. 74/523, 473 R, 480 B, 74/876, 878

[56] References Cited

UNITED STATES PATENTS

| | | | |
|---|---|---|---|
| 3,115,050 | 12/1963 | Marr | 74/876 |
| 3,153,945 | 10/1964 | Mitchell | 74/876 |
| 3,309,938 | 3/1967 | Pervier | 74/876 |
| 3,581,603 | 6/1971 | Farrington et al. | 74/876 |
| 3,894,443 | 7/1975 | Feller | 74/878 X |

*Primary Examiner*—Samuel Scott
*Assistant Examiner*—Frank H. McKenzie, Jr.
*Attorney, Agent, or Firm*—Andrus, Sceales, Starke & Sawall

[57] ABSTRACT

A single lever manual control for marine propulsion units includes a shift gear train and a throttle gear train mounted in side-by-side coaxial relation on a rotating input shaft, said trains terminating in shift lever and throttler lever outputs respectively. Push-pull cable units couple the levers to the engine. The throttle cable has an outer sleeve pivotally mounted by a pivot arm with a pivot axis adjacent the outer wall of the control housing. A key extends through the input shaft into a shift gear having a direct drive notch and an adjacent circumferentially enlarged warm-up notch. A warm-up button is connected to a rod which engages one edge of the key. A spring-loaded pin within the shaft engages the opposite key face to resiliently establish the direct drive connection. The button is depressed and forces the rod and key into the warm-up notch and the pin into an opening in a shift lever to prevent rotation thereof. The opening and pin are only aligned in neutral. A neutral start switch and a reverse lock solenoid switch are mounted adjacent a cam on a gear on the throttle gear train. Trim control switches in the lever are connected to a tubular connector unit within the shaft and having output leads wound about the shaft.

23 Claims, 10 Drawing Figures

ENGINE TRANSMISSION AND SPEED CONTROL WITH WARM-UP INTERLOCK APPARATUS

BACKGROUND OF THE INVENTION

This invention relates to engine drive transmission and throttle control apparatus and more particularly to an integrated throttle control and transmission shift control for marine engines and the like.

In marine propulsion systems, remote control mechanisms are generally provided to permit shifting of a gear transmission for the drive mechanism between neutral, forward and reverse from the forward portion of the boat and further permitting setting of the throttle for varying the engine speed. Single lever remote controls have been developed and interconnected to an integrated shift mechanism and throttle mechanism to permit control by pivotal movement of the single lever. Generally, the system provides for full forward or reverse gear engagement before the engine throttle mechanism is engaged. To permit warm-up and the like, various mechanisms have also been suggested to permit advancing of the throttle in the neutral drive position with the shift mechanism disengaged. Generally, such systems employ cam coupling and drive for selectively engaging and disengaging of the several mechanisms. For example, U.S. Pat. No. 3,309,938 assigned to the assignee of the present application discloses a cam operated single lever control having means for disengaging of the shift mechanism in response to actuation of a warm-up button. As more fully disclosed therein, the mechanism is mounted for actuation around a common drive shaft mechanism. The elements are held in a neutral position by a suitable detent means. When the warm-up button is actuated, the lever coupling to the shift mechanism is disengaged such that the shift mechanism is held in the neutral position by the detent. Although this and similar disconnect means have been suggested, a simple, reliable and positive interlock is desired which absolutely positively prevents shifting of the mechanism either accidentally or through malfunctioning when the warm-up button has been actuated. Further the total mechanism must be maintained within a small, compact and aesthetically pleasing unit to permit practical adaptation to a commercial production.

SUMMARY OF THE PRESENT INVENTION

The present invention is particularly directed to an integrated shift transmission and throttle control which is readily adapted to a single lever input and includes a warm-up control providing a positive interlock on the shift mechanism while permitting limited throttle advance in the neutral or warm-up position. Generally, in accordance with the present invention, a transmission drive train and a throttle drive train are coupled to a common input means. The coupling to the shift drive train includes a first releasable direct drive position and a second lost motion drive position in combination with a mechanical latch means movable into engagement with the shift drive train means with the movement to the second lost motion drive position. In the direct drive position, the input simultaneously drives the shift mechanism and the throttle mechanism, with the throttle mechanism including a lost motion drive to permit shifting prior to the actual throttle advance. In the alternate position, the lost motion means of the coupling means permits the movement of the input element and the interconnected throttle control to the extent of the lost motion construction thereby permitting throttle advance independent and separate from movement of the shift drive train means. The mechanical interlock to the shift drive train means, further positively prevents the rotation of the shift drive train such that when limit of the lost motion drive position is reached the limit of the warm-up throttle advance is also established.

More particularly in a unique, novel and practical construction a shift gear train and a throttle gear train means are coaxially mounted in side-by-side stacked relation on a rotating input element coupled to a single control level. The throttle gear train is coupled directly to the rotating element and includes a lost motion means permitting movement of the lever to either side of neutral by a predetermined number of degrees before effecting operative gear engagement. The shift gear train includes a coupling gear rotatably mounted on the rotatable input element and coupled together by an elongated slot and key means including a first direct drive coupling where the opening or notch portion essentially corresponds to the size of the key to provide for direct simultaneous rotation. The key and notch are mounted for relative movement in response to actuation of a push rod member coaxially mounted within the rotating element. Inward movement of the warm-up rod effects the relative movement of the key from alignment with the first drive position notch portion to a circumferentially enlarged notch portion. The rotating element can then move through a predetermined angular relationship before the shift gear train is engaged. This permits limited throttle actuation sufficient to increase the engine speed from idle prior to effecting an attempted movement of the gear transmission means. The relative movement of the key and slot coupling, however, further provides outward movement of a latch element into the train mechanism which positively prevents the movement of the shift gear train means and thereby positively locks the unit against further rotation. The interlock system thus simultaneously limits the throttle control and positively holds the shift gear train means against movement.

In a practical novel feature, the key extends through the rotatable element into the slot on the interior of the input gear of the shift gear train. A positioning rod is located axially of the rotating element and engages the edge of the key for selective positioning of the key between the two coupling notch portions. An interlock pin is mounted within the inner end of the rotating element and is spring loaded into engagement with the opposite face of the key and urges the key and the interconnecting rod to the first full drive position. Inward movement of the warm-up button positively forces the key into alignment with the lost motion notch portion and simultaneously moves the locking pin outwardly into an opening in the shift gear train plate to positively prevent rotation thereof. The opening in the shift plate is aligned with the interlock pin only with the shift plate in the neutral position such that the warm-up button can only be actuated with the shift mechanism in the neutral position. Once actuated, the shift gear train is locked in such neutral position. If an attempt should be made to actuate the warm-up button with the shift gear train already actuated, only slight movement occurs before the pin engages the gear shift plate which positively prevents any further movement thereof and the undesirable disengagement of the shift gear train.

Further, the throttle mechanism includes electrical interlocking switch means mounted adjacent a cam gear train coupled to the throttle gear train. The cam gear train rotates with the throttle gear train with the initial cam rotation effecting actuation of the switch means. The switches provide power to the starter unit and further positively engages the reverse solenoid actuator.

Further, the single lever control preferably includes suitable electrical trim control switches such as buttons with the electrical leads extending downwardly through the lever. The rotatable input element includes an integrated electrical connection box for providing sliding connection to electrical leads within the control box which are coupled with the suitable switch leads and extended through a common cable. The leads encircle the connection box and winds and unwinds much in the manner of a spring in response to the limited rotation of the connection box with the single lever control.

BRIEF DESCRIPTION OF THE DRAWINGS

The drawings furnished herewith illustrate a preferred construction of the present invention in which the above advantages and features are clearly disclosed as well as others which will be readily understood from the following description.

In the drawings.

DESCRIPTION OF THE ILLUSTRATED EMBODIMENT

Figure 1A:
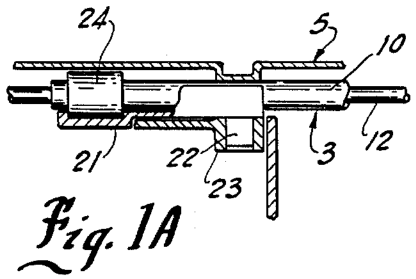
FIG. 1A is a section taken generally on line 1A—1A of FIG. 1.
Figure 1:
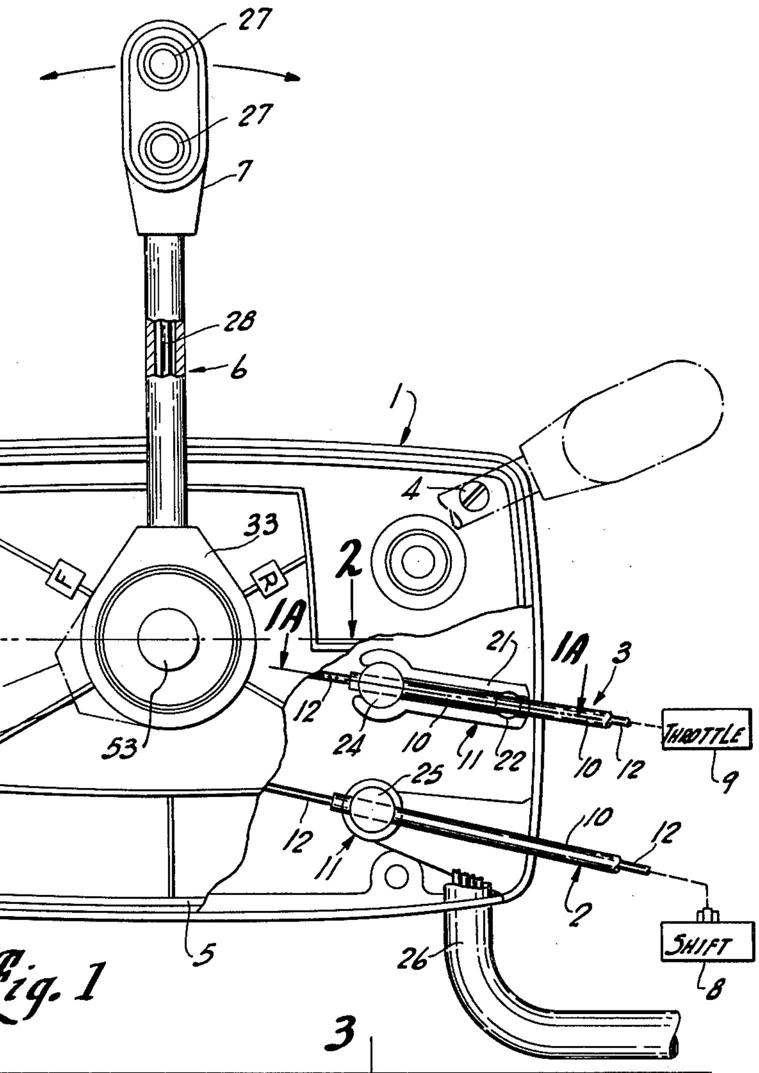
FIG. 1 is an elevational view of a single lever control including a broken away portion to show an improved cable mounting.

Referring to the drawings and particularly to FIG. 1, the present invention is illustrated in connection with a single lever control unit 1 adapted to be mounted on the forward portion of a boat, not shown, and connected by a pair of push-pull cables 2 and 3 to an aft mounted engine such as encountered in an outboard motor or inboard-outboard marine drives for propelling of a recreation type vehicle and the like. Generally, the control unit 1 will include a plurality of mounting bolts 4 adapted to extend through the peripheral edge portion of the control outer housing or box 5 for rigid mounting of the unit 1 to the boat for convenient access to the operator. The contol unit 1 generally includes a single operating lever 6 having an upper convenient handle 7 for position of the lever between a vertical centrally located neutral position, as illustrated in full line, and rotatably forwardly and rearwardly for effecting corresponding forward and reverse drive engagement of the shift gear followed by engine throttle operation. The shift cable 2 is coupled to the lever 6 within the control unit 1 and extends rearwardly and is coupled to the shift mechanism 8 between the engine and the drive unit. Similarly, the throttle cable 3 is connected to the single lever control unit 1 and extends rearwardly to the throttle control 9 on the engine.

The cables 2 and 3 are of a suitable construction such as the well-known push-pull types. Referring to cable 2, an outer conduit or sleeve 10 is adapted to be pivotally fixed to the control box 5 as at 11. An inner core 12 extends through the sleeve 10 and is connected to a pivoted shift lever arm 13 within the control box 5 and the shift operating mechanism 8 at the drive means. The illustrated connection includes a pin 14 to which the core 12 is affixed.

The cable 3 is similarly coupled to a throttle arm 15 by a pin 16, with the arm offset approximately 90°.

Figure 2:
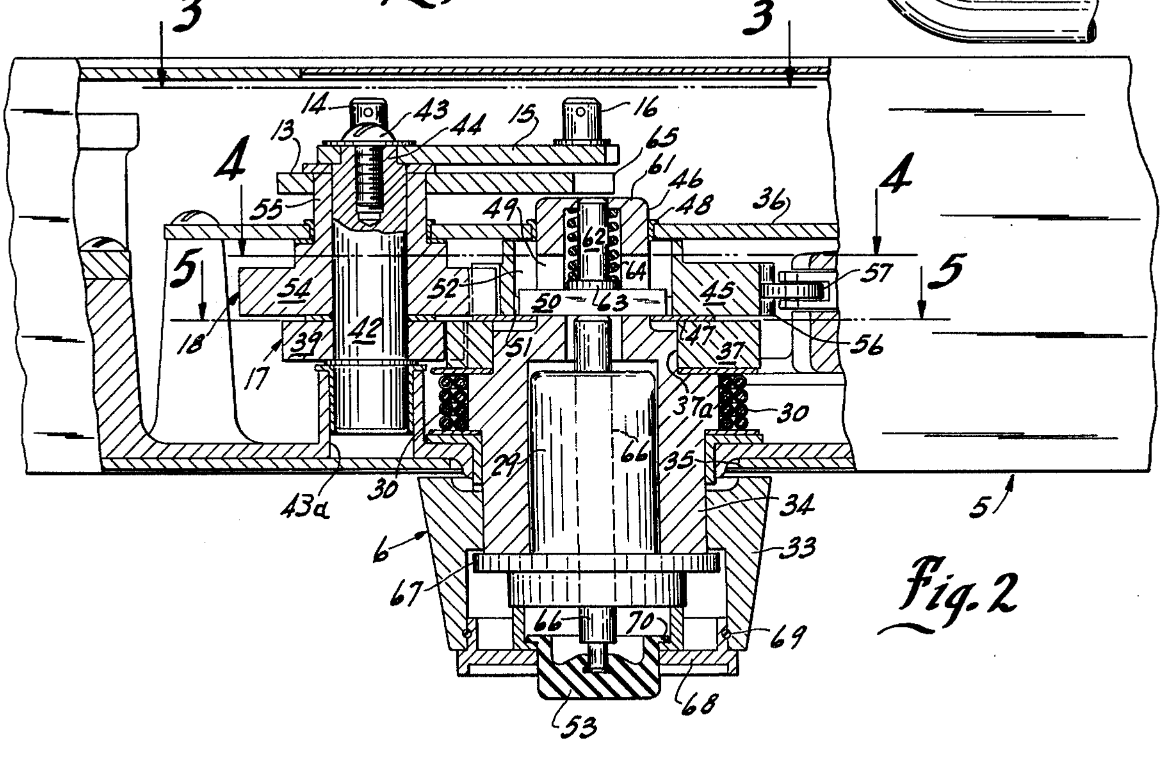
FIG. 2 is an enlarged horizontal section taken generally on line 2—2 of FIG. 1.

Generally, as more fully shown in FIG. 2, the single lever 6 is coupled to a throttle gear 17 within the control housing to rotate and selectively position throttle arm.

Similarly, a second shift gear train 18 couples the lever 6 to selectively position the shift arm 15 which is coupled to the shift cable 2.

Figure 3:
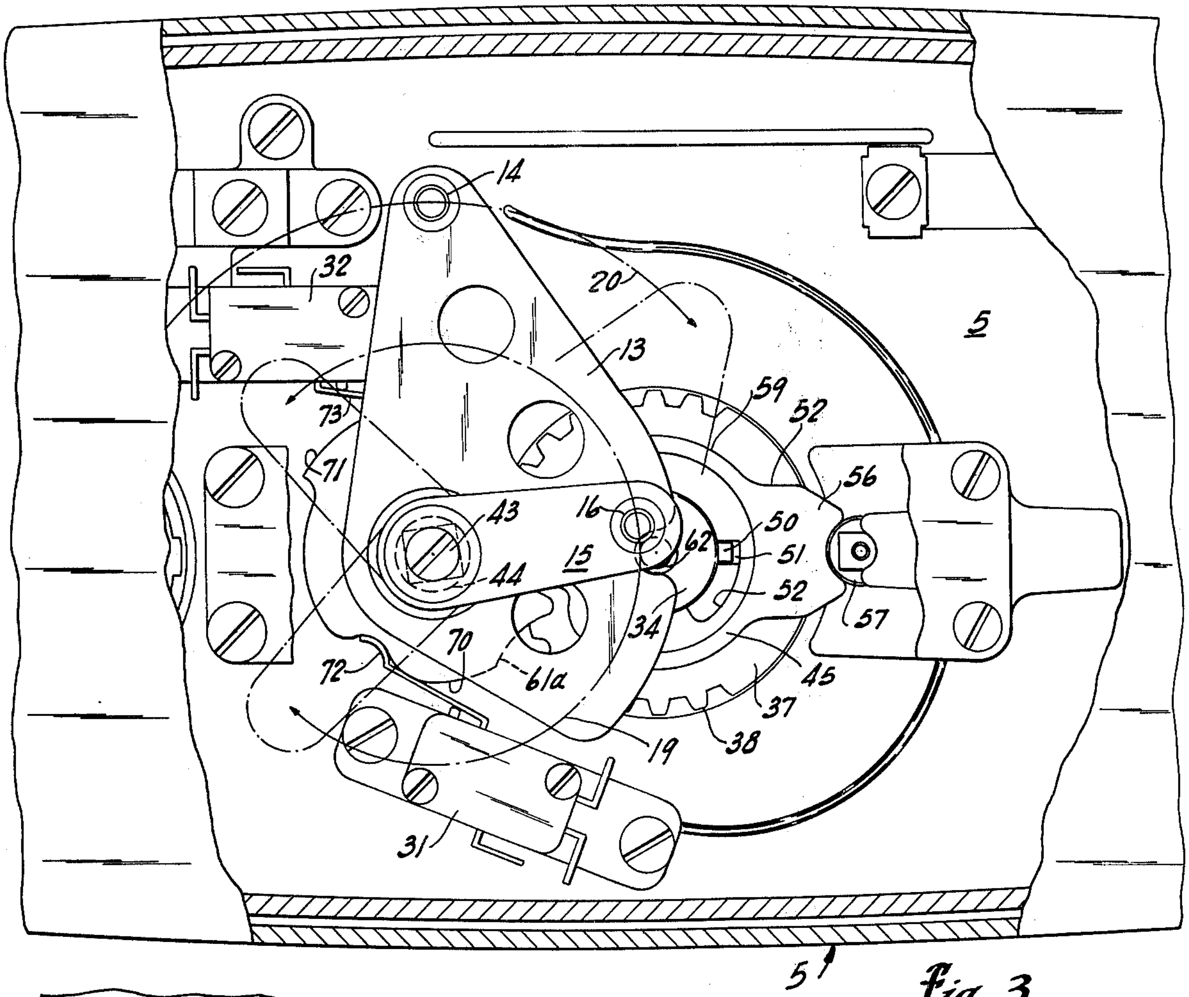
FIG. 3 is a view taken generally on line 3—3 of FIG. 2 and more clearly illustrating a throttle lever and a shift lever.

As shown in FIG. 3, the throttle arm 15 moves through a large angle 19 in moving to wide open throttle in forward and reverse whereas the shift arm 13 moves through a relatively small angle 20.

The pivot connections 11 of the cables 2 and 3 are adapted to compensate for the arcuate motion of the control arm with the reverse movement of lever 6. In accordance with a further novel teaching as shown in FIGS. 1 and 1A, the pivot connection 11 of the throttle cable 3 is moved outwardly to the furthermost edge of the control box 5 by a special pivot arm 21 located within the housing or box 5. Arm 21 has a pivot shaft 22 pivoted within a hut 23 immediately adjacent the outermost side edge of box 5. The arm 21 has a generally U-shaped cross-section with cable sleeve 10 located therein and terminating at the inner end in a conventional encircling sleeve clamping cylinder 24 coupled to the inner end of arm 21. The arm 21 pivots about the shaft axis to correspondingly pivot the cable 3 to thereby limit the inclusion angle as the throttle lever arm 15 rotates through about 270° or 135° to each side of the center neutral position.

The shift lever 13 moves through a much smaller angle and the sleeve clamping collar 25 is pivoted within the housing as shown.

The unit 1, particularly as applied to an inboard-outboard unit, normally includes interlocking electrical controls with a power cable 26 coupled between the control box and the engine and drive unit. For example, the lever 6 may have control trim buttons 27 incorporated in the outer handle 7 with leads 28 appropriately extending downwardly through the lever 6 and the control box 5 to the power cable 26 for appropriate interconnection. A circuit connector 29 is located within the housing 5 coaxially of lever 6 as hereinafter described, and includes inner coupling leads 30 wound about the inner lever assembly for connection to cable 26. Additionally locking and trim locking switches 31 and 32 may be incorporated within the control box 5, as hereinafter described, and connected in the system through the power cable 26.

More particularly, as most clearly shown in FIG. 2, the lever 6 includes a lower hub member 33 secured into a rotating sleeve bearing and input shaft 34 rotatably mounted within an opening 35 in the housing 5. The gear trains 17 and 18 are secured to shaft 34 and clamped in position by a clamping plate 36.

Figure 5:
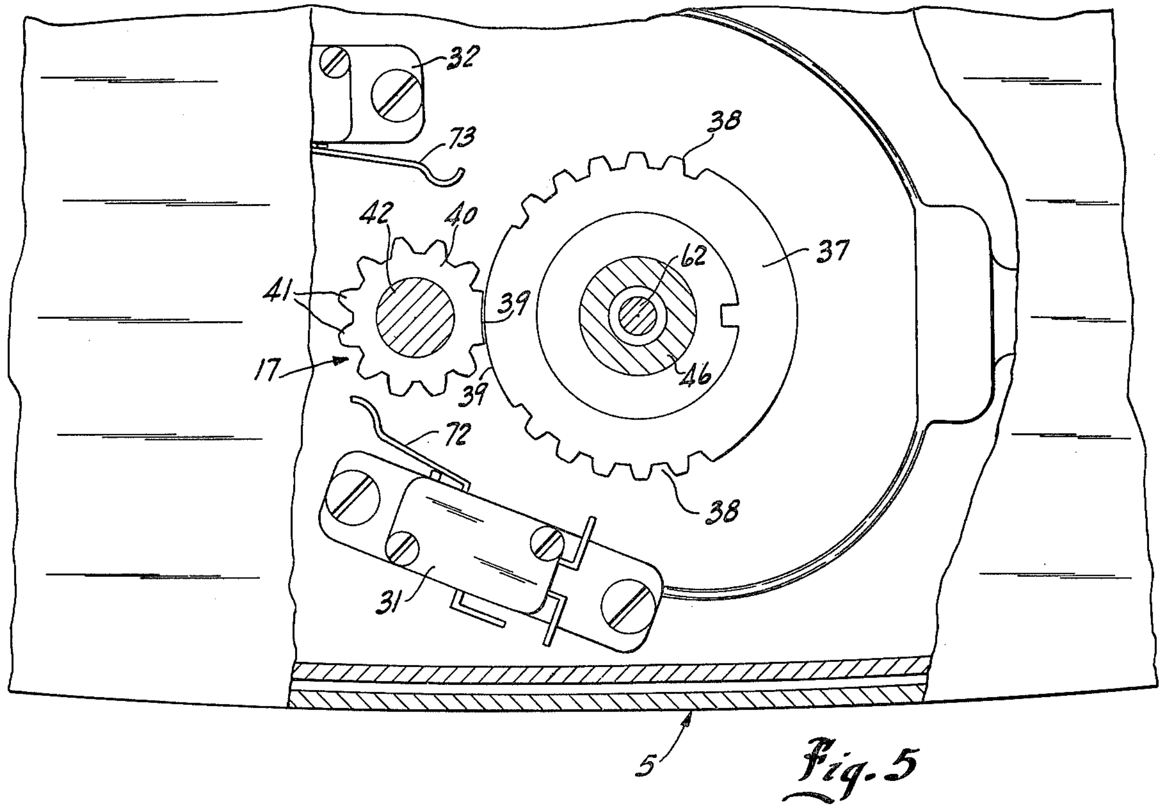
FIG. 5 is a horizontal section taken generally on line 5—5 of FIG. 2 illustrating the throttle gear train.
Figure 6:
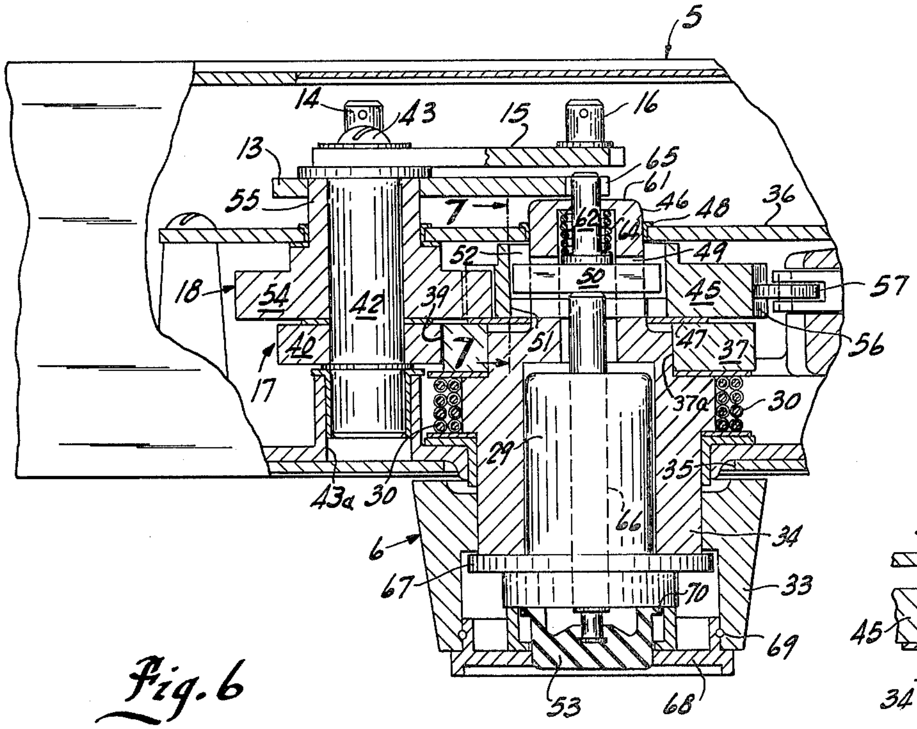
FIG. 6 is a view similar to FIG. 2 illustrating the mechanism in the warm-up position.
Figure 7:
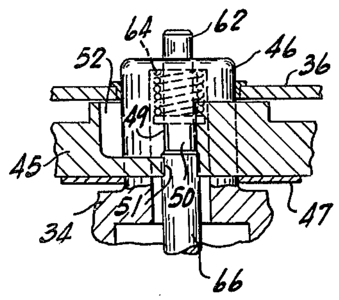
FIG. 7 is a fragmentary view taken generally on line 7—7 of FIG. 6.

The throttle gear train 17 includes a driver gear 37 secured to a stepped portion or hub 37*a* of the input shaft 34 and rigidly affixed thereto. The gear 37 can be press fitted to the hub of the input shaft. The driver gear 37, as more clearly shown in FIG. 5, is a generally circular member having a pair of teeth segments 38 located to opposite sides of the gear and separated by a toothless neutral circular portion 39. A throttle driven spur gear 40 is mounted with a similar neutral portion 39 aligned with the smooth neutral portion 39 of the throttle gear driver 37, and with gear teeth 41 extending completely around the circumference thereof to the opposite sides of such neutral portion 39. The throttle driven gear 40 is suitably secured to a shaft 42. As illustrated, the shaft 42 is rotatably mounted in a hub member 43*a* formed adjacent the front wall of the housing 5 and projects rearwardly through the clamping plate 36. After preselected initial rotation of the lever 6, gear 40 and shaft 42 rotate as a result of one of the two gear segments 38 moving into engagement with the gear teeth 41. The throttle arm 15 is secured as by a cap screw 43 to the outer end of the shaft 42 which is suitably formed with a square end and opening interlock as at 44 such that the position of the throttle arm 15 is directly related to the angular rotation and orientation of the idler shaft 42. This, in turn, provides corresponding positioning of the throttle rod 12 of cable 3 which is transmitted to the engine throttle 9.

The shift gear train means 18 generally includes a shift driver gear 45 rotatably mounted on a reduced or stepped down portion 46 of the control shaft 34 immediately adjacent to the throttle driver gear 37 with a thrust washer 47 therebetween. The shaft 46 projects through a bearing opening 48 in the clamping plate 36 which abuts the gear 45 to clamp the assembly in place. The shift driver gear 45, however, is not fixedly connected to the shaft 46 but is coupled thereto through a special multiple position coupled means to selectively establish a direct drive connection to the shaft 34 or a limited lost motion connection thereto as follows.

The shaft 34 and particularly portion 46 includes a lateral or diametrical slot 49 in alignment with the shift driver gear 45. A coupling key 50 shown as a flat rectilinear key extends through the slot 49 with the opposite end projected outwardly therefrom. The internal diameter of the shift driver gear 45 includes an especially formed groove or notch extending axially of the gear. In particular, the coupled mean includes a small rectangular notch portion 51 and a circumferentially extended adjacent notch portion 52. Portion 51 is formed on the one end of the gear 45 immediately adjacent to the stepped portion and the separating thrust washer 47 between the driver gears 37 and 45, as most clearly shown in FIGS. 2, 4, 6 and 7. The key 50 is spring-loaded to engage notch 51 and is movable into notch 52 by positively depressing warm-up button 53 coaxially mounted within the lever hub 33. The notch 51 is of a width essentially corresponding to the width of the key 50 and with the key in mating alignment therewith establishes a direct coupling from the shaft 34 to the gear 45. The rotation of the lever 6 and attached shaft 34 is thereby transmitted directly to the shift driver gear 45.

Figure 4:
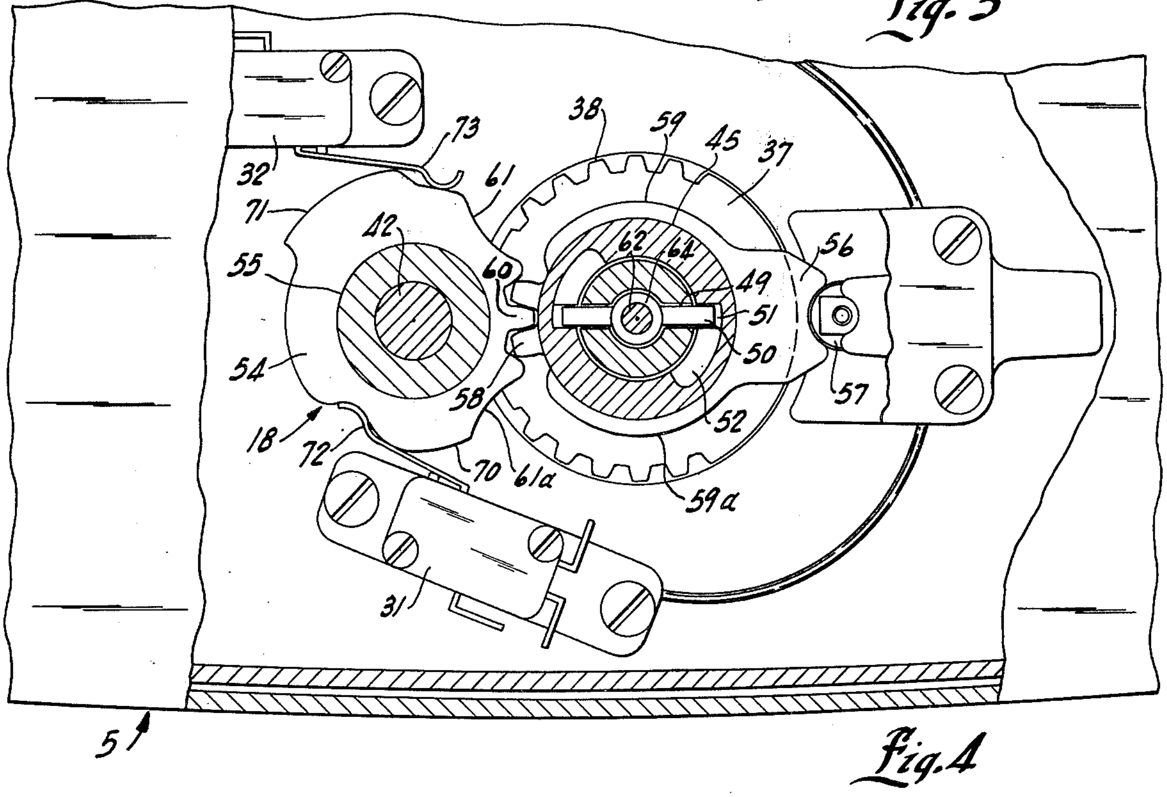
FIG. 4 is a sectional view taken generally on line 4—4 of FIG. 2 and illustrating the shift gear train.
Figure 8:
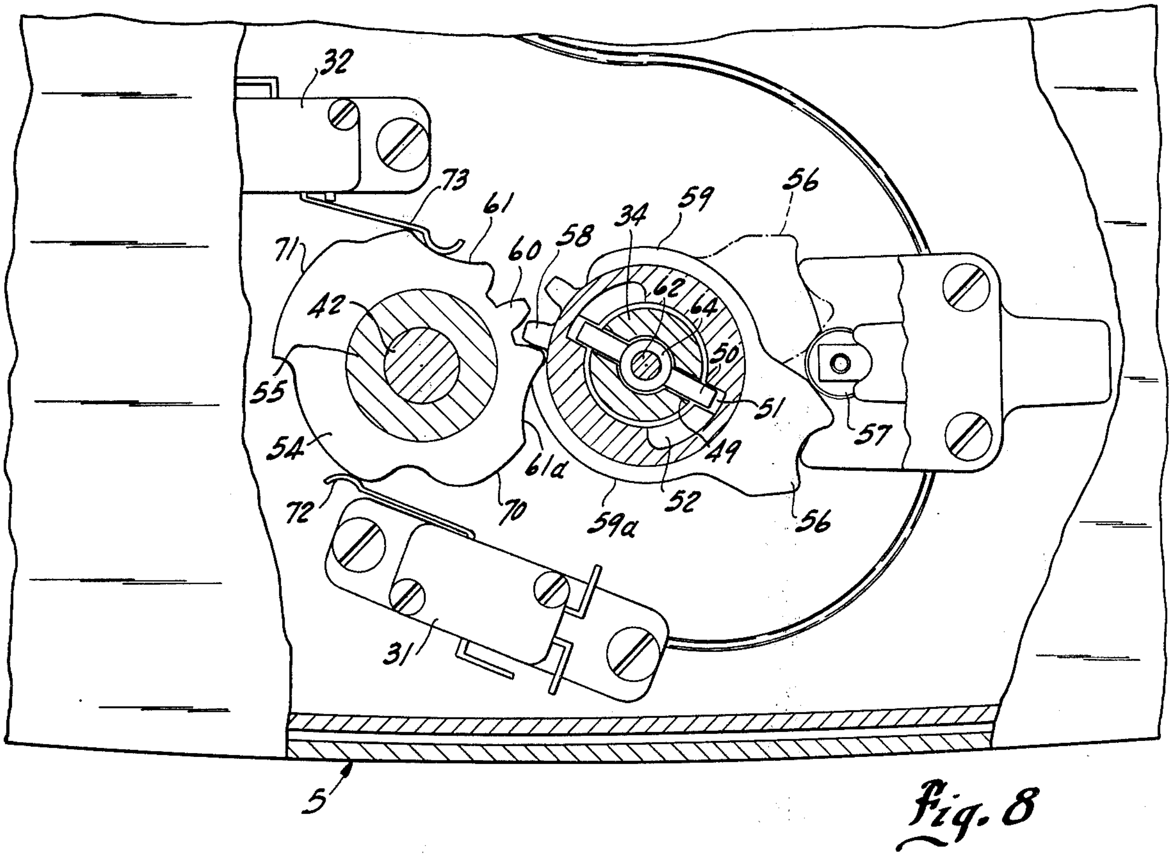
FIG. 8 is a horizontal section similar to FIG. 4 and illustrating the shift gear train in the actuated position with the warm-up control unactuated.

The shift driver gear 45 is especially formed to mate with a shift driven gear 54 which is rotatably mounted upon the throttle idler shaft 42, as most clearly shown in FIGS. 4 and 8. The shift driven gear 54 includes an outwardly projecting stepped hub 55 which projects through the bearing opening in the clamping plate 36. The shift hub 55 is spaced inwardly from the throttle lever 15 by a suitable thrust washer therebetween. The shift arm 13 in the form of a plate is affixed to and rotates with the hub 55 such that the rotation of the shift driver gear 45 is transmitted to the shift plate 13.

As shown most clearly in FIG. 4, the shift driver gear 45 has a small recessed locking segment 56 projecting outwardly in the plane of the gear and mating with a spring latch member 57 fixedly mounted within the housing 5 and resiliently locking the gear in the illustrated position of FIG. 4 corresponding to the neutral position of the lever. Diametrically opposite thereto and facing the shift driven gear 54, a gear segment 58 is formed on the shift driver gear 45 with a pair of adjacent toothless circular portions 59 and 59*a* to the opposite sides of the gear 52. A corresponding gear segment 60 is formed on the shift driven gear 54 with a pair of circular recesses 61 and 61*a* immediately adjacent the opposite sides of the gear segment. Thus, as the lever 6 is rotated, the shift driver geear 45 simultaneously rotates the driven gear 54 as a result of the mating teeth. After predetermined rotation related to the angular rotation of the shift arm or plate 13 necessary to effect full forward or reverse direction engagement, depending upon the direction of rotation of the lever, the circular cam portion 61 or 61*a* rolls into mating engagement with the circular portion 59 or 59*a* of the driven gear 45. Further rotation of the gear merely rotates the teeth 58 further from engagement with the teeth 60.

With the key 50 mating with the drive notch portion 51, the rotation of the lever 6 and shaft 34 results in the simultaneous rotation of the throttle and shift gear trains 17 and 18 with consequent interrelated positioning of the throttle and shift levers 13 and 15.

As viewed in FIGS. 4 and 5, the initial rotation of the control lever 6 results in movement of the shift gear train 18 to drive the shift plate 13 until a full shift position is established after which the throttle gears of train 17 as shown in FIG. 5 will engage and the continued rotation thereof effects repositioning of the throttle lever 15 with the shift gear train 18 merely rolling freely within the aligned portion of the driven gear.

Figure 9:
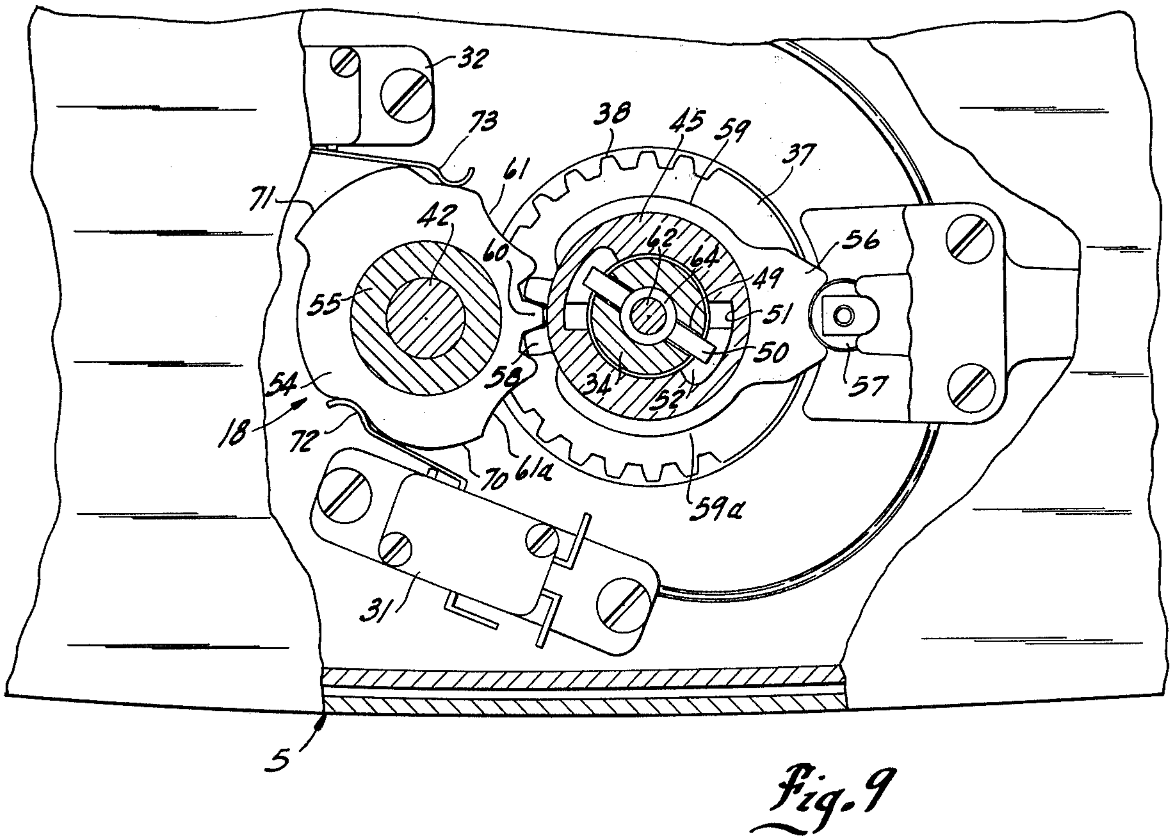
FIG. 9 is a view similar to FIG. 8 illustrating similar movement of the throttle mechanism and of the gear shift mechanism with the warm-up control actuated.

The shift driver gear further has the lost motion or warm-up recess or notch portion 52 immediately adjacent to the drive notch portion 51. As most clearly illustrated in FIGS. 7–9, the warm-up notch portion 52 is a circumferential extension in the direction of rotation associated with forward drive positioning of the lever 6.

With the key 50 positioned axially within the warm-up notch portion 52, rotation of the input shift 34 may be effected in the forward throttle direction with the key 50 moving through the circumferentially extended notch portion 52 to permit the throttle movement with the shift driver gear 45 held immovable by the spring latch 54. Rotation to the end of notch portion 52 or in the reverse or opposite direction engages the wall of the notch portion 52 and tends to provide a rotation of the shift driver gear train 18.

In accordance with the present invention with the key 50 moved into portion 52 and thus in the warm-up position, the shift gear train 18 is positively held immobile and thereby positively presents rotation of the control lever 6 and shaft 24 beyond the forward throttle position defined by the leading edge of the notch portion 52 or any reverse rotation, as follows.

The shift plate 13 projects over the protruding shaft 34. A locking pin 62 is slidably mounted within the shaft 34 with an inner head 63 abutting the key 50. A spring member 64 is compressed between head 63 and the outer base of the shaft portion 46 to resiliently urge the pin 62 to the retracted position. The locking key 50 is positioned rearwardly into direct drive engagement with the notch portion 51. The outer end of the pin 62 generally is retracted into or immediately adjacent to the outer end face of the shaft 34 and thus in slightly spaced relation to the shift plate 13. The shift plate 13 may therefore freely move past the end of the shaft 34. The shift plate 13 includes a latch or locking opening 65 aligned with the pin 62 in the neutral position of the plate 13.

A rod 66 coaxially mounted within connector 29 and shaft 34 couples the warm-up button 53 to the key 50. Consequently, inward movement of the warm-up button 53 results in the inward movement of the key 50 to notch 52 and the outer end of the pin 62 moving outwardly from the shaft 34 and into the latching opening 65 of the shift plate 13. This provides a mechanical interlock on the shift plate 13 which positively preventing rotation thereof. This holding force is transmitted backwardly through the shift gear train 18 to positively prevent rotation of the gear 45 and therefore of lever 6 after the key 50 engages an end wall of notch 52.

During a normal shift operation, the initial movement of the shift mechanism which occurs before any throttle movement under normal conditions, results in a pivoting of the shift plate 13 into overlying relations to the end of the shaft 34 and particularly the locking pin 62. The warm-up button 53 cannot therefore be depressed to interfere with the normal shift drive.

The connector 29 is clamped within the shaft 34 to suitably support rod 66 by a flange 67 abutting the outer end of the shaft 34 and an outer clamping cover 68 which abuts the outer face of the connector 29. The cover 68 telescopes into the hub 33 and is releasably secured by a detent unit 69 within the outermost end of the hub.

The warm-up button 53 is generally a rubber-like member having an inner flange 70 abutting the inner wall of the clamping member and projecting outwardly through a corresponding opening in the clamping cover 68.

As also previously noted, marine propulsion controls are preferably provided with certain interlocking switches to restrict operation of the engine to relatively safe procedures and conditions. For example, with electrical start engines it is highly desirable to provide means limiting starting of the engine to a neutral position. In the illustrated embodiment of the invention and particularly as shown in FIGS. 4 and 8, the shift driven gear 54 is provided with switch actuating cam surfaces 70 and 71 on the edge circumference and in spaced relation to the gear segment 60 and the idler curved edges 61 and 61*a*. In particular, the neutral switch snap action switch 31 is mounted within the housing 5 including an operating lever arm 72 resiliently engaged or urged into engagement with the cam surface 70 which includes a small detent engaged by the outermost end of the arm 72 in the neutral position. Rotation of the shift driven gear 54 in either direction results in an outward movement of the cam surface 70 with actuation of the neutral switch which will prevent starting thereof.

Reverse interlock switch 32 is also mounted within the control housing 5 in circumferentially spaced relation to the neutral switch 31. It is similarly constructed and includes a lever arm 73 projecting outwardly into engagement with cam surface 71. The forward rotation of the shift gear 54 allows the lever arm 73 to move downwardly onto the curved portion 61 maintaining the open state of the reverse lockout switch for preventing the motor from lifting upwardly under reverse. Reverse rotation of the shift gear train 18, however, results in opposite or clockwise rotation of the shift driven gear as viewed in FIGS. 4 or 8. The reverse lockout switch arm 73 rides upwardly and outwardly onto actuating cam surface 71 to close the switch while operating in reverse.

The control unit 13 is designed to minimize the size requirements of the control box generally as contrasted to a cam throttle shift arrangement and ensures maintaining reliable operation of the various switches and permitting a warm-up design feature. The invention thus provides a very simple, reliable and practical construction of a control unit for remotely controlling of an outboard propulsion unit.

Various modes of carrying out the invention are contemplated as being within the scope of the following claims, particularly pointing out and distinctly claiming the subject matter which is regarded as the invention.

We claim:

1. In a drive control apparatus for an engine driven marine propulsion unit having a speed control means and directional drive control means, a supporting enclosure, a speed setting means, a directional drive setting means, a movable selection input means, a direction coupling means between said input means and said setting means and having a first coupling position to transmit the position of the input means to the directional drive setting means and a second lost motion coupling position transmitting the motion of the input means to the directional drive setting means only after a selected movement of the input means, and a warm-up control means coupled to the direction coupling means and having interlock means moved by said warm-up control means into immobilizing engagement with said directional drive setting means to restrict the movement thereof in response to movement of said direction coupling means to establish said second coupling position.

2. The drive control apparatus of claim 1 wherein said warm-up control means includes a single input element coupled to simultaneously operate said direction coupling means to the second lost motion coupling position and said interlock means into said immobilizing engagement with said drive setting means.

3. The drive apparatus of claim 2 wherein said interlock means further includes means holding said movable selection input means immovable from said first coupling position with the directional drive control means offset from a selected starting position.

4. The drive control apparatus of claim 2 wherein said selection input means includes a single input lever connected to said direction coupling means, a throttle coupling means connected to said lever including a lost motion connection whereby the movement of said lever is first transmitted to the throttle coupling means and subsequently to the directional coupling means, said second lost motion coupling of said direction coupling means defining the limit of movement of said lever with the directional coupling means in said coupling position.

5. The drive control apparatus of claim 4 wherein said lever is reversibly movable from a neutral drive position to a forward drive position and oppositely to a reverse drive position, said second lost motion coupling of said direction coupling means being established only for the forward drive position of said lever.

6. The drive control apparatus of claim 5 including a neutral start switch means and a reverse lock switch means, and means coupled to said direction coupling means to actuate said neutral switch means in response to either movement of said lever from the neutral drive position and to actuate said reverse lock switch means only in response to movement of said lever to the reverse drive position from neutral.

7. The drive apparatus of claim 2 wherein said input means includes a single input element selectively oppositely movable from a neutral position to a forward drive position and alternatively to a reverse drive position, said drive setting means including a plate movable in the plane of the plate, said interlock means including a pin means and a notch means, one of which is connected to the plate to permit engagement in only one position of said plate.

8. The control apparatus of claim 1 including an outer enclosure box and a push-pull mechanical linkage from the control apparatus to the engine and including an outer rigid conduit and an inner operating core connected to said directional drive setting means, a pivot arm pivotally mounted within the control box immediately adjacent to the inlet wall of the mechanical linkage and extending inwardly therefrom, means securing said rigid conduit to said pivot arm at the innermost end of the pivot arm to thereby locate the pivot point of the linkage immediately at the outer wall thereof and establishing a maximum pivot arm to the connection to the directional drive setting means.

9. In a drive control apparatus for an engine driven marine propulsion unit including an engine throttle means and a gear shift means for positioning from a neutral position to a forward drive position and to reverse drive position, a supporting housing, a throttle and shift control input unit movably mounted within the housing, a single control lever secured to said input unit and reversibly movable from a central neutral position to a forward drive position and alternatively to a reverse drive position, a throttle gear train means having a throttle coupling means coupled to the input unit and positioned therewith, a shift gear train means including a direction coupling means having a first coupling position to transmit the position of the input unit to the shift gear train means and a second lost motion position transmitting the motion of the input unit only after a selection movement of the input unit to the shift gear train means, a warm-up control means coupled to said direction coupling means and moving the direction coupling means between said first and second coupling positions, said warm-up control means including interlock means moved into releasable connection with said shift gear train means and operable to immobilize said shift gear train means with the warm-up control means moved to establish said second coupling position.

10. The control apparatus of claim 9 wherein said interlock means further including means holding said warm-up control means immovable from a standby position with the shift gear train means offset from a neutral position.

11. The control apparatus of claim 9 wherein said input unit includes a rotating shaft member, said shift gear train means includes an input gear rotatably mounted on the shaft member, said direction coupling means including a key means and a mating notch means provided respectively on the facing surfaces of the gear and the shaft, said key means and mating notch means being relatively movable axially of said shaft means to establish said two coupling positions.

12. The control apparatus of claim 11 wherein said key means extends from the opposite surface of said shaft member, said gear having an opening with said notch means therein and including a notch essentially corresponding to the key and adapted to mate therewith to provide mechanical interlock for direct drive of the shift gear train means in accordance with the rotation of the shaft member, and including an axially offset circumferentially enlarged notch to permit selective rotation of the shaft member within said input gear, said warm-up control means moving said coupling means to said second position and positioning of said key within said circumferentially enlarged notch portion to permit limited movement of the throttle gear train means independently of said shift gear train means.

13. The apparatus of claim 12 wherein said interlock means includes a pin member slidably mounted within the shaft member and adapted to project outwardly therefrom, said pin being mounted in engagemnt with said key and moving therewith, said shift gear train means including a lever plate overlying the shaft member and including a locking opening aligned with said pin in the neutral position, said plate including a wall portion to the opposite sides of said locking opening and moving into overlying engagement with the outer end of the pin in response to movement of the plate from said neutral position to positively lock said pin against operative movement.

14. The operation of claim 13 wherein said warm-up means includes an actuating rod slidably mounted within said shaft and engaging the key opposite said pin, and having a warm-up button secured to the outer end of the rod, and resilient means urging the rod, key and pin to the first coupling position.

15. The control apparatus of claim 11 wherein said interlock means includes a latching pin and opening means one of which forms a part of the shift gear train means and the other of which is secured to the housing, said interlock means being movable to establish the second coupling position only in the neutral position of the lever.

16. The apparatus of claim 9 wherein said shift gear train means includes a pair of mating shift gears including mating gear segments and adjacent idle curved segments formed in a peripheral portion of the gears, said gears being reversibly moved by said control lever, at least one of said gears including an edge cam portion adjacent the curved segments, a control switch having a switch lever riding on the shift gear having said cam portion and responsive to selected rotation of said gears from said neutral position to actuate the switch means to prevent operation of the engine.

17. The control apparatus of claim 16 wherein said switch is a neutral start switch and said cam portion has a central position and similarly changing portions to the appropriate sides thereof to actuate the switch for both rotations of said shift gear.

18. The control apparatus of claim 16 wherein said switch is a reverse lock switch connected to a trim control means and located within the housing and including an operating arm resiliently riding on the periphery of the shift gear, said switch cam portion including a neutral portion adjacent one of said curved segments and an oppositely located lobe portion extending oppositely of said curved portion, a shift gear member immediately adjacent a curved idle segment such that rotation of the shift gear to align the idle segment with the arm maintains the switch in the non-activated state, said cam lobe projecting outwardly immediately adjacent the neutral position of the reverse lock switch arm and operable to move said switch arm, said switch being activated by only the rotation of said gear to a reverse position to actuate a reverse lock solenoid in a reverse drive condition.

19. The control apparatus of claim 11 wherein said lever includes a handle and trim control switch means within the handle and having lead means extended downwardly through said lever into the control box, a connector mounted within the outer end of said rotating shaft member and providing for connection of said leads to the interior of the control housing, said connector having a central coaxially opening, said warm-up control means including a rod journaled within said connector and extending from the opposite ends thereof, an outer cover member secured to said lever and clamping said connector within said shaft and having a central opening, a control button located within said central opening and having an inner flange abutting the inner end of the wall of the outer covering to support the control button and rod within the connector, the inner end of said control rod abutting said key means, said shift gear train means including an output lever in the form of a plate pivotal in the plane of the plate and overlying the inner end of said shaft member, said interlock means including an opening in the plate aligned with the end of the shaft in the neutral position of the control lever, said interlock means including a locking pin slidably mounted within the inner end of said shaft member and a coil spring means urging said pin into engagement with the key with the pin retracted from the shift gear train plate.

20. The control apparatus of claim 9 including a push-pull mechanical linkage from the control unit to the engine and including an outer rigid conduit and an inner operating core pivotally interconnected to said shift gear train means, a pivot arm pivotally mounted within the control housing immediately adjacent to the inlet wall of the mechanical linkage and extending inwardly therefrom, means securing said rigid conduit to said pivot arm at the innermost end of the pivot arm to thereby locate the pivot point of the linkage immediately adjacent the outer edge wall of the housing and establishing a maximum pivot arm between the control lever and the pivot connection to the control box.

21. The control apparatus of claim 20 including a push-pull mechanical linkage to the throttle gear train and having an outer sleeve pivotally mounted within the housing in spaced relation to the outer edge wall.

22. The control apparatus of claim 9 wherein said input unit includes a stepped rotating shaft member, said throttle gear train including a driver gear affixed to the shaft member, a throttle driven gear having a shaft rotatably mounted within the housing with a lever secured to the outer end thereof, said shift gear train means includes a driver gear rotatably mounted on the shaft member adjacent the throttle driver gear and a driven idler gear rotatably mounted on said throttle shaft and having a hub projecting toward the throttle lever, a shift plate secured to the hub of said shift driver gear beneath the throttle lever and overlying the end of the shaft member, said direction means including a key extending through a slot in said shaft member and mating with a pair of oppositely located notch portions provided respectively on the inner surface of the shift driver gear, said notch portion essentially corresponding to the key and adapted to mate therewith with the lever in the neutral position to provide mechanical interlock for direct drive of the shift driver gear in accordance with the rotation of the lever and shaft member, and said notch portion including an axially offset circumferentially enlarged notch extended in the direction of the forward shift movement of said key to permit selective rotation of the shaft member within said shift driver gear, said warm-up control including a rod coaxially slidably mounted within said operating shaft member and adapted to be moved axially inwardly to position said key within said circumferentially enlarged notch, said interlock means includes a pin member slidably mounted within the shaft member to the opposite side of the key from said rod member and projecting outwardly therefrom through a reduced opening in the end of the shaft, a spring means encircling the pin within the shaft and urging the pin, key and rod to the retracted pin position, said shift plate overlying the end of the shaft member and including a locking notch aligned with said pin in the neutral position, said plate including a wall portion to the opposite sides of said locking notch and moving into overlying engagement with the outer end of the pin in response to movement of the plate from said neutral position to positively lock said pin against operative movement.

23. The apparatus of claim 22 wherein said shift gear train includes a driven gear including a gear segment mating with a gear segment on the driver gear and each having immediately adjacent cylindrical idle segments formed in a peripheral portion of the gear, said shift driven gear having switch operating cams adjacent each of the idle segments, a neutral control switch located within said housing and having a switch arm riding on the one cam and responsive to rotation of said shift driver gear from said neutral position to actuate the neutral switch means to prevent operation of the engine, a reverse lock switch located within the housing and including an operating arm riding on the opposite cam from said neutral switch cam and engaging the idle segment in response to one rotation of the driven gear and the cam in response to opposite rotation of the driven gear, said idle segment engagment with the arm maintaining the switch in the non-activated state, said cam moving said switch arm to actuate said reverse lock switch to actuate a reverse lock solenoid in a reverse drive condition.

* * * * *

UNITED STATES PATENT OFFICE

CERTIFICATE OF CORRECTION

Patent No. 4,027,555 Dated June 7, 1977

Inventor(s) Roy J. Rauchle et al.

It is certified that error appears in the above-identified patent and that said Letters Patent are hereby corrected as shown below:

Column 6, line 31, after "driver" cancel "geear" and insert -- gear --.

Column 9, line 10, after "said" insert -- second --.

Column 9, line 64, before "movement" cancel "selection" and insert -- selected --.

Signed and Sealed this

*Seventh* Day of *February 1978*

[SEAL]

*Attest:*

RUTH C. MASON
*Attesting Officer*

LUTRELLE F. PARKER
*Acting Commissioner of Patents and Trademarks*